United States Patent
Elias

(10) Patent No.: US 10,045,510 B2
(45) Date of Patent: Aug. 14, 2018

(54) SARGENT BLUE OUTDOOR K-9 FEEDER

(71) Applicant: Jesus M. Elias, Houston, TX (US)

(72) Inventor: Jesus M. Elias, Houston, TX (US)

( * ) Notice: Subject to any disclaimer, the term of this patent is extended or adjusted under 35 U.S.C. 154(b) by 0 days.

(21) Appl. No.: 14/741,290

(22) Filed: Jun. 16, 2015

(65) Prior Publication Data
US 2016/0366851 A1  Dec. 22, 2016

(51) Int. Cl.
*A01K 5/01* (2006.01)

(52) U.S. Cl.
CPC .......... *A01K 5/0142* (2013.01); *A01K 5/0114* (2013.01)

(58) Field of Classification Search
CPC .......... A01K 5/01; A01K 5/00; A01K 5/0225; A01K 5/025; A01K 5/0142; A01K 5/0114
USPC .............. 119/51.5, 61.3, 61.1, 52.1
See application file for complete search history.

(56) References Cited

U.S. PATENT DOCUMENTS

| | | | | |
|---|---|---|---|---|
| 65,004 A * | 5/1867 | Pope | ................... | A01K 5/0114 119/51.5 |
| 101,766 A * | 4/1870 | Richardson | .......... | A01K 5/0114 119/51.5 |
| 343,386 A * | 6/1886 | Algeo | .................. | A01K 5/0114 119/51.5 |
| 993,630 A * | 5/1911 | Worsham et al. | ... | A01K 5/0114 119/51.5 |
| 1,102,629 A * | 7/1914 | Anderson et al. | ... | A01K 5/0114 119/51.5 |
| 1,254,193 A * | 1/1918 | Beach et al. | ......... | A01K 5/0114 119/51.5 |
| 1,343,093 A * | 6/1920 | Shoultz | ............... | A01K 39/012 119/51.5 |
| 1,895,435 A * | 1/1933 | Ahrens | ................ | A01K 5/0225 119/51.5 |
| 3,196,835 A * | 7/1965 | Bergevin | ............. | A01K 5/0291 119/51.11 |
| 3,741,162 A * | 6/1973 | Lopez | .................. | A01K 5/0291 119/51.13 |
| 4,050,415 A * | 9/1977 | Conger | ................ | A01K 5/0225 119/51.5 |
| 4,134,365 A * | 1/1979 | Futers | .................. | A01K 5/0225 119/51.5 |
| 4,466,382 A * | 8/1984 | Babbitt | ................ | A01K 5/0233 119/52.1 |
| 4,688,520 A * | 8/1987 | Parks | ................... | A01K 5/0291 119/51.11 |
| 4,860,691 A * | 8/1989 | Mayer | ................... | A01K 7/027 119/51.5 |

(Continued)

FOREIGN PATENT DOCUMENTS

GB         2129266 A  *  5/1984  ............... A01K 5/02

*Primary Examiner* — Son T Nguyen
(74) *Attorney, Agent, or Firm* — Delphine James

(57) ABSTRACT

The present invention is a pet feeding apparatus with an elongated polyhedron shape with directly opposed feeding and drinking portions with a feeding bin disposed therebetween. The feeding apparatus is bounded by a bottom wall attached to the lower edges of opposing side walls and a top wall attached to the top edges of the opposing side walls. The top wall overhangs the feeding troff and the drinking compartments. The bottom wall is supported by legs that terminate in a reservoir that contains an insect repellant liquid. The apparatus is made of a material that repels heat to allow the water to prevent overheating of the water.

2 Claims, 4 Drawing Sheets

(56) References Cited

U.S. PATENT DOCUMENTS

| | | | | |
|---|---|---|---|---|
| 4,964,535 A * | 10/1990 | Curwen | ............... | A01K 5/0275 |
| | | | | 119/56.1 |
| 5,335,624 A * | 8/1994 | Baxter | .................... | A01K 5/01 |
| | | | | 119/51.5 |
| 6,167,840 B1 * | 1/2001 | White | .................. | A01K 5/0142 |
| | | | | 119/61.53 |
| 8,082,881 B2 * | 12/2011 | Lush | .................... | A01K 5/0114 |
| | | | | 119/51.5 |
| 8,272,350 B1 * | 9/2012 | England | ............... | A01K 5/0225 |
| | | | | 119/52.1 |
| 2002/0096120 A1 * | 7/2002 | Busha | .................. | A01K 5/0291 |
| | | | | 119/51.5 |
| 2003/0217699 A1 * | 11/2003 | Arruarte Mendizabal | ................ | |
| | | | | A01K 5/0291 |
| | | | | 119/51.5 |
| 2010/0162961 A1 * | 7/2010 | Hove | .................. | A01K 5/0142 |
| | | | | 119/51.5 |
| 2013/0192527 A1 * | 8/2013 | Reid | .................... | A01K 5/0291 |
| | | | | 119/51.11 |

\* cited by examiner

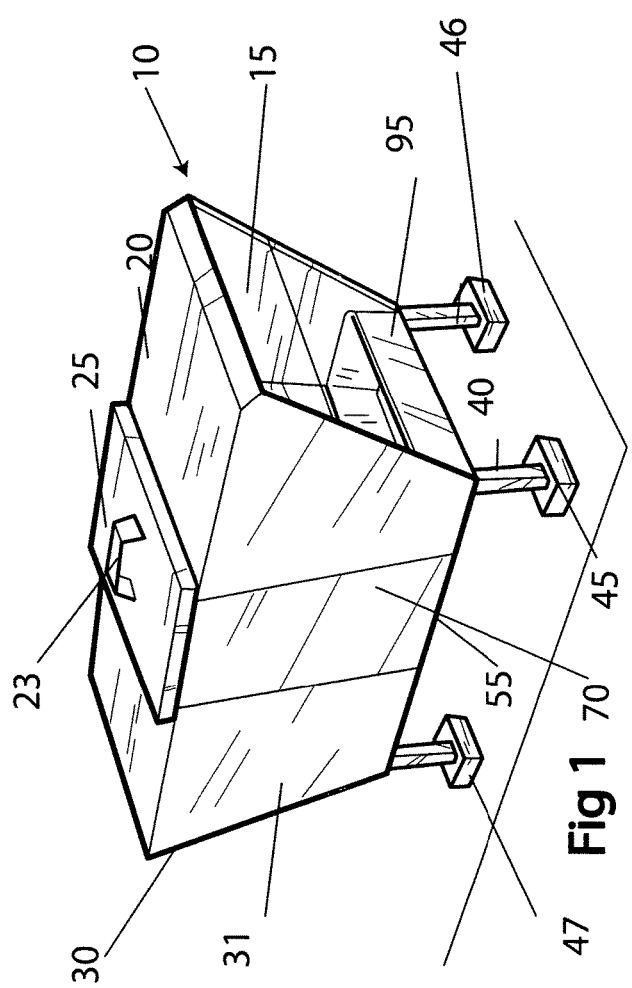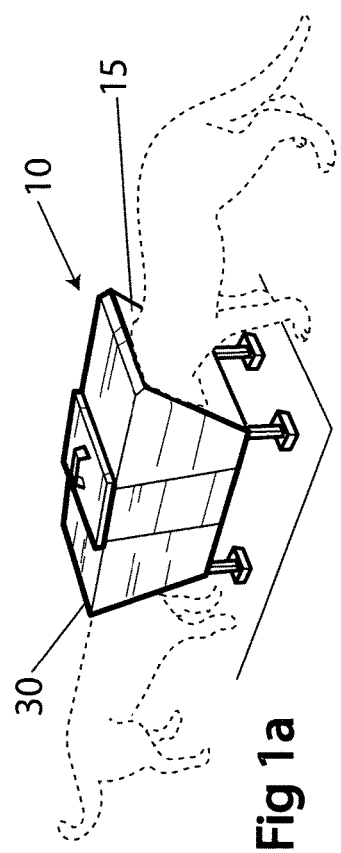

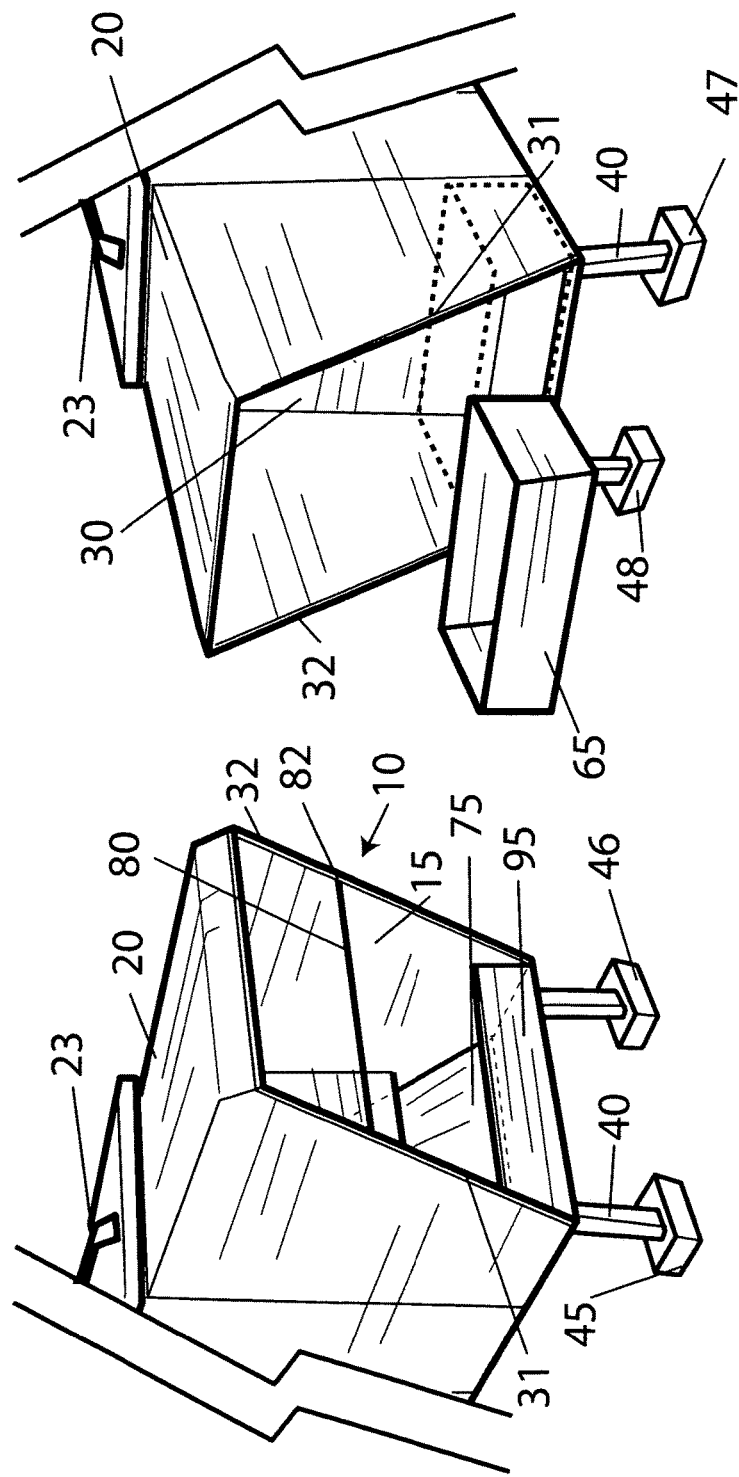

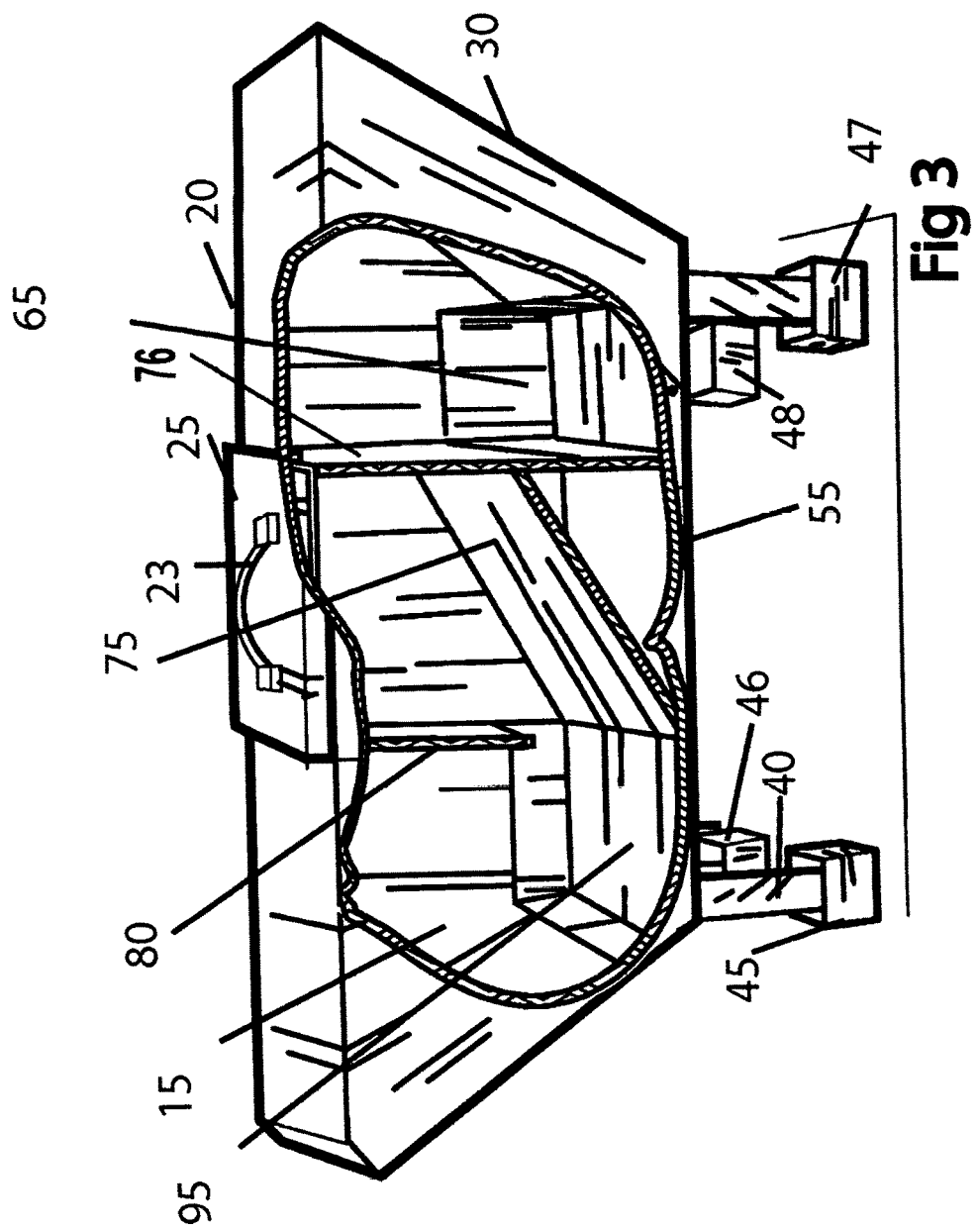

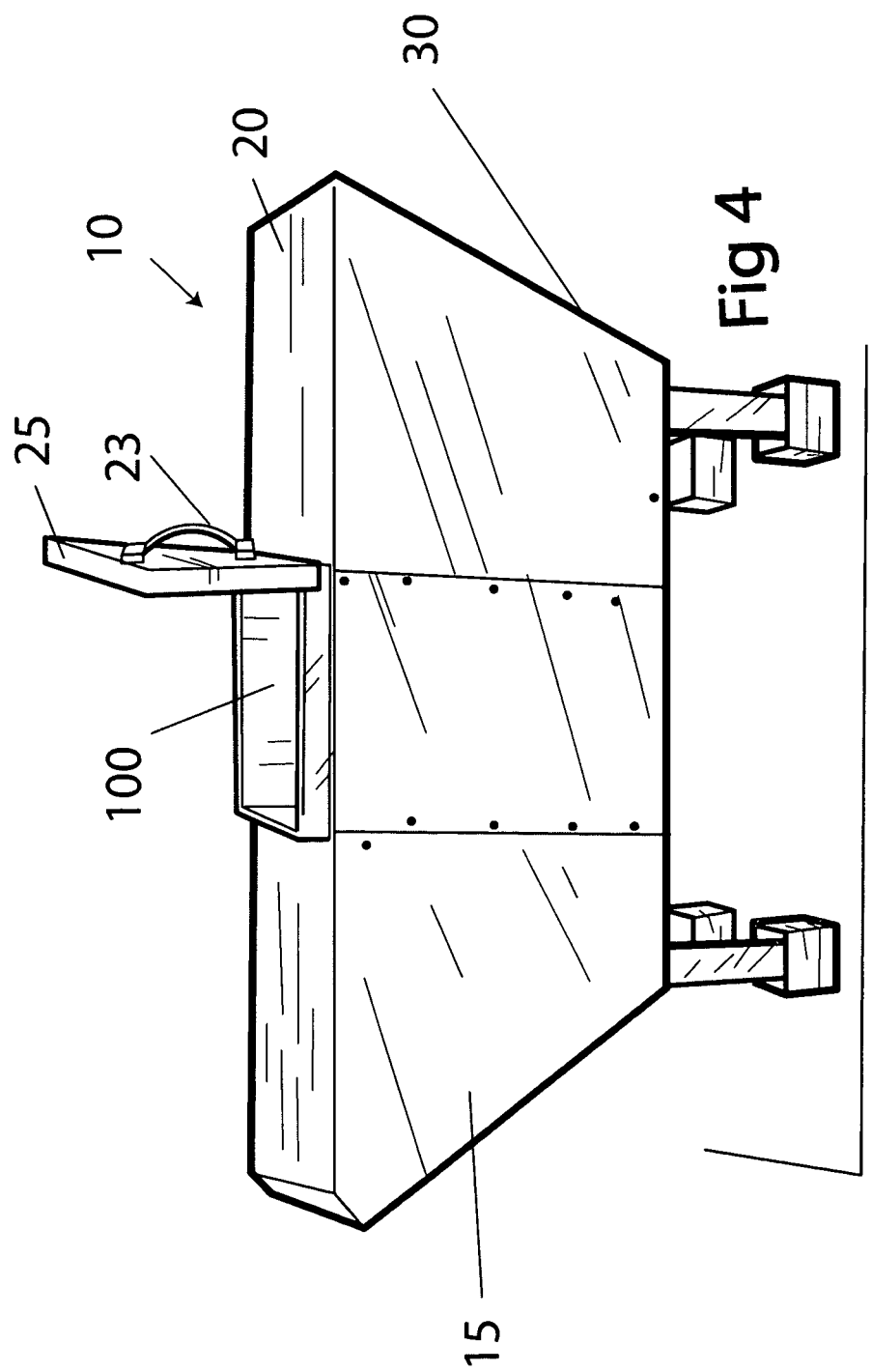

SARGENT BLUE OUTDOOR K-9 FEEDER

NON-PROVISIONAL PATENT APPLICATION SPECIFICATIONS

This application claims the benefit of Ser. No. 61/997,984

BACKGROUND OF THE INVENTION

This invention relates to a pet feeder and pet waterer more particularly a portable pet feeder and waterer. When an owner keeps a pet outside of the home or leaves a pet for an extended period of time outside providing safe water and food is required. The food needs to be kept safe from the forces of nature and the water needs to be kept at a suitable temperature.

The present invention provides an improved pet feeder that keeps insects and birds from entering the feeder as well as design that keeps the water at suitable temperature.

SUMMARY OF THE INVENTION

One of the main objectives of the present invention is to provide an improved pet feeder and waterer which allow storage for an extended period of time. Another objective of the present invention is to prevent insects and birds from entering the feeding portion of the present invention.

The present invention is a pet feeding apparatus with an elongated polyhedron shape with directly opposed feeding and drinking portions along with a feeding bin therebetween. In the preferred embodiment the feeding apparatus is for dogs, but can be designed for other types of animals. The feeding apparatus is bounded by a bottom wall attached to the lower edges of opposing side walls and a top wall attached to the top edges of the opposing side walls. The top wall overhangs the feeding trough and the drinking compartments. The bottom wall is supported by legs that terminate in a reservoir that contains an insect repellant liquid. The apparatus is made of a material that repels heat to allow the water to prevent overheating of the water.

The above and other objects, features and advantages of the present invention should become even more readily apparent to those skilled in the art upon a read in of the following detailed description in conjunction with the drawings wherein there is shown and described illustrative embodiments of the invention.

BRIEF DESCRIPTION OF DRAWINGS

These and other details of the present invention will be described in connection with the accompanying drawings, which are not furnished only by way of illustration and not in limitation of the invention.

FIG. 1 is a side perspective view of the present invention.

FIG. 1a is a side perspective view of the present invention illustrating the pet drinking and feeding position.

FIG. 2 is front perspective view of the feeding position.

FIG. 2a is a front perspective view of the drinking position.

FIG. 3 is a cross-sectional view of the present invention.

FIG. 4 illustrates a side perspective view with food bin opened.

DETAILED DESCRIPTION OF THE INVENTION

Embodiments are described more fully below with reference to the accompanying figures, which form a part hereof and show by way of illustration, specific exemplary embodiments. The embodiments are disclosed in sufficient detail for one skilled in the art to practice the invention. It is to be understood that the various embodiments may be implemented in many different forms and should not be construed as being limited to the embodiments set forth herein.

The feeding apparatus of the present invention is designated as numeral (10). As shown in FIGS. 1 and 4, the dog feeder portion of the present invention is designated as (15) and the drinking portion of the present invention is designated as (30). The feeding apparatus (10) has a polyhedron shape with directly opposing drinking portion (30) and feeding portion (15) along with a food bin (70) disposed therebetween.

FIGS. 1 and 1a illustrates the drinking and feeding position of apparatus (10). The body of the present invention has an elongated polyhedron shape with directly opposed drinking (30) and feeding (15) portions. Disposed between the drinking and feeding portions is food bin (70). The body of the apparatus (10) can be made of or coated with a material that diffuses or repel the sunlight wherein the water within the drinking portion (30) does not overheat such as zinc or another suitable material.

As shown in FIGS. 1 and 3 the feeding apparatus (10) is bounded by a bottom wall (55), a top wall (20), a first side wall (31) and opposing second side wall (32). Bottom wall (55) extends laterally and attaches to the bottom edge of first side wall (31) and the opposing side wall (32). The top wall (20) extends laterally and parallel above the bottom wall (55) and attaches to the top edge of the first side wall (31) and the opposing second side wall (32).

The underside of the bottom wall (55) is supported by a plurality of leg members (40) that terminates within a reservoir container (45, 46, 47 and 48). Each reservoir container comprises a bottom wall with surrounding side walls that linearly extend upward to an intermediate distance encompassing each leg member (40). In use each reservoir contains an insect repellant liquid to stop insects such as ants and other bugs from crawling upward into the feed trough.

The opposing sides of top wall (20) extends laterally outward hanging above the opened drinking portion (30) and the feeding portion (15), respectively. The hanging hood is formed by the outer edges of top wall (20) extending forward above the opened area and then extending rearwardly at an incline downward to the base of the bottom wall (55).

Food bin (70) is formed from a centrally located compartment within the body of apparatus (10). Food bin (70) is disposed between the back panel (32) of the drinking portion and the front panel (31) of the feeding portion. The top wall (20) has a central opening (100) which extends vertically downward to the bottom wall (55) which forms the internal compartment of food bin (70). Lid (25) overlays central opening (100) and protects the food therein from the elements of the environment. Handle (23) provides a user the ability to easily open and close lid (25). Additionally lid (25) can be hingedly connected to top wall (20).

As shown in FIG. 3 the drinking portion is shown on the right side of the body of apparatus (10). Drinking container (65) is removable and is formed by a bottom wall with surrounding side walls that extend vertically upward. The opened drinking portion (30) is formed by a right internal panel (76) disposed internally a set distance between the first side wall (31) and the opposing second side wall (32). As depicted the right internal panel (76) extends vertically downward to the bottom wall (55) adjoining perpendicularly with bottom wall (55) wherein an L Shape bottom is form within the bottom of drinking portion (30) for receiving the underside of the bottom wall of drinking container (65) thereon. The water pan (65), the feed trough (95) and the leg member (40) can be made of stainless steel or another suitable material. The side walls and the bottom walls can be connected utilizing stainless steel rivets.

Additionally, a wired line (82) extends laterally between opposing side walls (31 and 32) connecting therewith within in opened feeding portion (15). The wired line (82) is disposed horizontally across and above feed trough (95). The wired line (82) prevents birds or other small animals from entering the feed trough (95).

As shown in FIG. 3 the feeding portion is shown on the left side of the body of apparatus (10). Feeding trough (95) is formed within the bottom of the feeding portion (15) of apparatus (10). As depicted feeding trough (95) is defined by a bottom wall with surrounding side walls that extend vertically upward an intermediate distance. The opened feeding portion (15) is formed by a left internal panel (80) disposed internally a set distance between the first side wall (31) and the opposing second side wall (32). As depicted the left internal panel (80) extends vertically downward and parallel to right internal panel to an intermediate distance wherein an opening is formed leading into feeding trough (95). To provide a bottom wall (55) of drinking container (65) thereon. The top wall (20) can be approximately 14 feet long by 4 feet wide. The bottom wall (55) would be slightly smaller dimensions. However, the apparatus body can be adjusted to the size of the pet.

The opened feeding portion (15) further comprises an inclined panel (75) that extends diagonally from the first panel through the opening and terminating with the bottom wall within the open feeding trough area. The food compartment is formed from a top opening within the top wall and extending vertically downward into a cavity formed between the left internal panel and the right internal panel.

What is claimed is:

1. A feeding apparatus comprising: a housing having a polyhedron shape with a top wall, a bottom wall, a first side wall, and an opposing second side wall; the top wall, the bottom wall, the first side wall, and the opposing second side wall form a feeding portion, a drinking portion and a food bin; the top wall is aligned horizontally parallel above the bottom wall; the top wall having a longer length than the bottom wall; the top wall having first and second outer edges, the first and second outer edges form hanging hoods over the drinking portion and the feeding portion; the first side wall inclined inwardly at a set distance from the first outer edge to join with the bottom wall; the opposing second wall inclined inwardly at a set distance from the second outer edge to join with the bottom wall; the first side wall aligned vertically parallel to the opposing second wall to form an unitary chamber therebetween; a left internal panel disposed internally a set distance between the first side wall and the opposing second side wall; a right internal panel disposed internally a set distance between the first side wall and the opposing second side wall; the left internal panel extends vertically downward from the top wall and parallel to the right internal panel to a distance above the bottom wall to form an opening that leads into a feeding trough; the feeding trough formed by a portion of the bottom wall that extends upward and the portion is between the first side wall and the opposing second side wall; the right internal panel extends vertically downward from the top wall to the bottom wall; an inclined panel extends diagonally from the right internal panel to the opening that leads into the feeding trough and connects to the bottom wall; the first side wall and the opposing second side wall extend diagonally inward from corners of the top wall and terminating at respective corners of the bottom wall to define a front overhang section directly opposite a rear overhang section; a lid hingedly attached to an opening in the top wall for allowing food to be placed therein; a wire line horizontally disposed below the top wall interconnecting the first side wall to the opposing second side wall; a removable drinking container comprising a bottom wall with surrounding side walls that extend linearly upward therefrom; the drinking container placed in the drinking portion between the first side wall and the opposing second side wall; a plurality of leg members extend from the bottom wall to support the housing; the plurality of leg members terminate in a plurality of reservoir containers, the plurality of reservoir containers filled with a liquid to prevent small insects from entering the feeding apparatus.

2. The feeding apparatus of claim 1 wherein the top wall is fourteen feet long by four feet wide.

* * * * *